United States Patent [15] 3,681,704

Davidson [45] Aug. 1, 1972

[54] SHARED VOLUME AND TONE CONTROL SYSTEM

[72] Inventor: John R. Davidson, Lake Zurich, Ill.

[73] Assignee: Motorola, Inc., Franklin Park, Ill.

[22] Filed: Oct. 8, 1971

[21] Appl. No.: 187,620

[52] U.S. Cl.....................330/124, 179/1 D, 330/130, 330/145, 333/28 T

[51] Int. Cl.................................................H03f 3/68

[58] Field of Search.........330/29, 130, 134, 124, 145, 330/126; 333/28 T; 179/1 D

[56] References Cited

UNITED STATES PATENTS 3,414,830 12/1968 Hellwarth..................330/124 R

*Primary Examiner*—Roy Lake
*Assistant Examiner*—James B. Mullins
*Attorney*—Foorman L. Mueller et al.

[57] ABSTRACT

A shared volume and tone control system for a plurality of audio amplifier stages includes a volume control potentiometer coupled between a bias potential and a resistance which is grounded. The output of the potentiometer is coupled to each amplifier stage. A resistor and diode is connected in series to the junction of the volume control potentiometer and grounded series resistance and to the output of a tone control potentiometer, which is connected by separate series resistances to the junction of each capacitor and diode combination forming the tone control network between each amplifier stage and ground.

8 Claims, 2 Drawing Figures

SHARED VOLUME AND TONE CONTROL SYSTEM

BACKGROUND OF THE INVENTION

Various circuit designs have been proposed to provide shared volume and tone controls for multiple amplifier sound reproducing systems such as quadrasonic sound systems which utilize four separate speakers to reproduce the four discrete channels of sound information contained on the record medium. For the most part these have been relatively complex and expensive systems requiring a relatively large number of mechanical and electrical components. Furthermore, in some applications it is desirable to provide three distinct tone responses from the controls, i.e., a "flat" response, bass boost and combination bass boost and treble cut. However, many of the proposed systems lacked a smooth transition from one tone response to another, with the transition from "flat" response to bass boost and to bass boost with treble cut resulting in noticeable, abrupt changes in tone.

SUMMARY OF THE INVENTION

It is an object of this invention to provide a shared volume and tone control system for a plurality of audio amplifier stages.

It is another object of this invention to provide a volume and tone control system in which there is a smooth transition from one frequency response to another, which responses include a "flat" response, bass boost, and bass boost with treble cut.

It is a further object of this invention to reduce the cost of volume and tone control systems for a plurality of audio amplifiers.

It is yet another object of this invention to reduce the number of parts required for volume and tone control for a plurality of audio amplifiers.

A shared volume and tone control system for a plurality of audio amplifier stages includes a volume control potentiometer having a variable output connected to each of the amplifier stages, and a fixed output which is coupled to the variable output of a tone control potentiometer through a resistance and diode in series combination.

The tone control potentiometer is coupled between a bias potential and ground reference potential, and the control wiper arm, or output is coupled to each amplifier stage through a resistance connected to the junction between a series connected capacitor and diode coupled between the input of each amplifier stage and ground reference potential. With the tone arm adjusted to the ground potential a "flat" response is produced. As the wiper is adjusted away from the ground potential and the bias is increased, the diode coupling the fixed output of the volume control to the tone control output becomes back biased and begins to turn off, resulting in bass boost. With the tone control potentiometer being operated to a point where the diode turns off, the bias on the tone control diode is increased forward biasing the diode to the point where high frequency input signals to the respective amplifier stages are shunted through the tone control capacitor and diode to ground reference potential creating a treble cut. Consequently, the tone response smoothly changes from "flat" response to bass boost, and finally to bass boost with treble cut.

DETAILED DESCRIPTION

Figure 1:
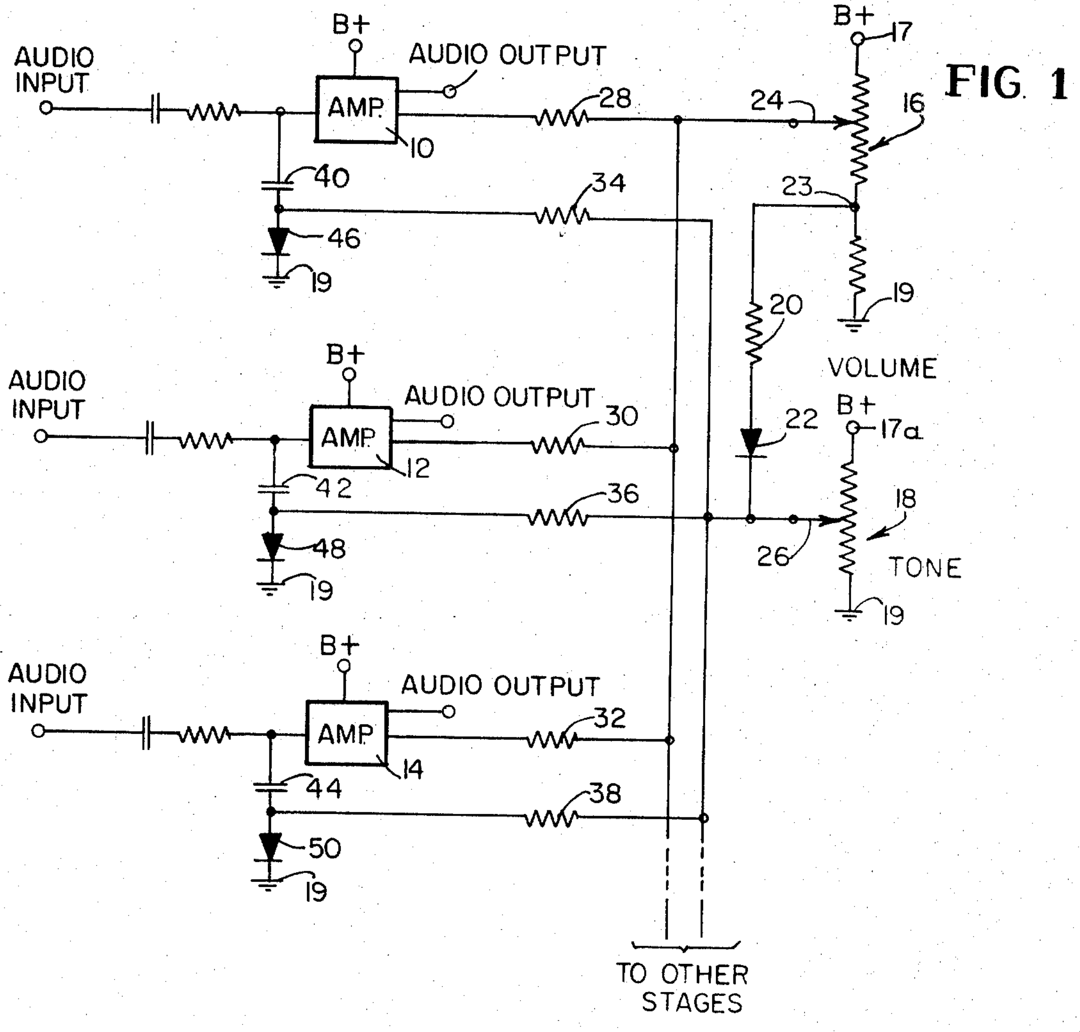
FIG. 1 is a schematic diagram of the shared volume and tone control system of the present invention.

Referring to the drawings, FIG. 1 shows a schematic diagram with three amplifier stages 10, 12 and 14 in a shared volume and tone control system. More stages may be added further exemplifying the shared control feature, however, the description of the diagram (FIG. 1) as shown sets forth the teachings of this invention. Both the volume control potentiometer 16 and tone control potentiometer 18 are connected between the bias potential 17, or B+, and ground reference potential 19. Potentiometers 16 and 18 have taps or wiper arms 24 and 26 respectively which provide potentiometer output voltages each of which may be separately varied. In an audio amplifier a variation in the potentiometer is accomplished with a tuning knob and shaft which are well known in the art. Both the volume potentiometer 16 and the tone control potentiometer 18 may be separately tuned, each potentiometer controlling a plurality of amplifier stages. However, because of the series connection of the resistor 20 and diode 22 between a tap 23 on the volume control potentiometer and the output of the tone control potentiometer, variations in the tone control will have some effect upon the volume of the audio output of each amplifier stage.

The tone control of the system is varied among three separate responses including "flat" response, bass boost, and bass boost with treble cut. This system with a plurality of stages sharing one tone potentiometer accomplishes smooth transition from one tone response to the next as the tone control is varied. This smoothness in response is due to the variable resistance of the diode 22 and diodes 46, 48 and 50. The voltages across the diodes are maintained at sufficiently low levels, generally in the range from 0 to 1 volt, so that the variable resistances of the diodes are in the range where they can be effectively used. In controlling the volume of each audio output of the separate amplifier stages, the wiper arm 24 of the volume potentiometer 16 is connected in parallel with resistors 28, 30 and 32 which in turn are series connected to the respective amplifiers 10, 12 and 14. Consequently variation in the potentiometer wiper arm 24 setting will provide an equal voltage across each of the resistors 28, 30 and 32 which in turn will affect each of the audio outputs of the amplifier stages 10, 12 and 14 respectively, depending upon the circuitry of each of the separate amplifier stages.

Figure 2:
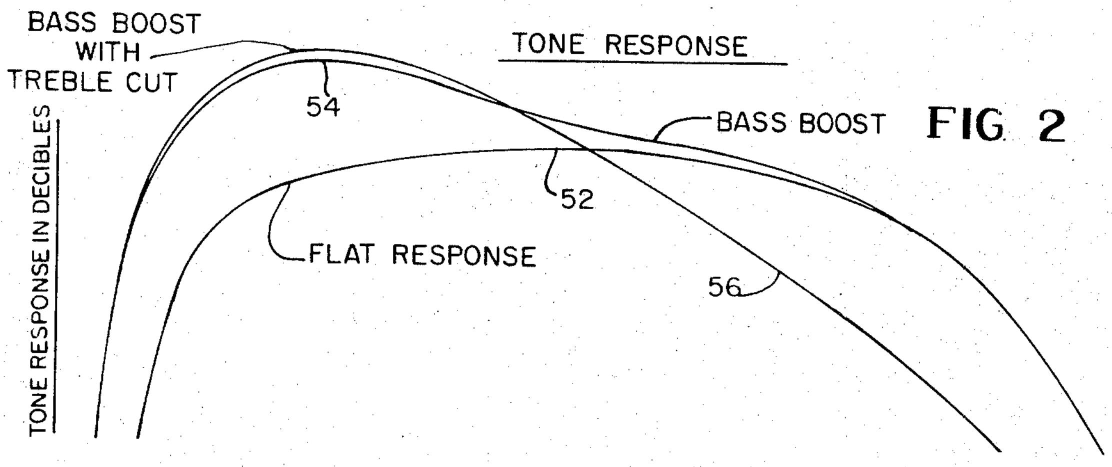
FIG. 2 is a graph showing the frequency response of the volume and tone control system.

With the volume control set, the tone control, when varied, operates in a different fashion than the volume control. The tone control of the system operates integrally with the volume control circuitry. With the tone control wiper arm 26 set at the reference potential 19, the frequency response of each audio amplifier output is essentially "flat." The flat portion 52 of the response curve of FIG. 2 shows that the tone response is substantially the same over a wide range of frequencies.

As the tone control wiper arm 26 is shifted from the reference potential, however, the diode 22 which has been conducting gradually is back biased until it cuts off. As the diode cuts off it gradually increases the volume of the amplifiers and provides a bass boost. This bass boost is realized in the form of increased tone response in the lower frequency range of the amplifier. Curve 54 of FIG. 2 shows that the tone response in the lower range of frequencies is greater than the flat response 52, while in the higher range of frequencies of the audio amplifier, the bass boost coincides with the flat response.

Bass boost with treble cut has a tone response curve, however, which is different from that of bass boost. The high range of frequencies of the bass boost with treble cut curve 56 as shown in FIG. 2 does not coincide with the curve of the flat response 52 or even that of the bass boost response 54, but instead rapidly drops off to zero tone response before that of either of the other curves. Bass boost with treble cut is produced with further shifting of the tone control wiper 26 from the bass boost response. In addition to diode 22 turning off, as wiper 26 of the tone control potentiometer is adjusted away from the reference potential 19, the voltage across resistors 34, 36 and 38 gradually turns on, or forward biases diodes 46, 48 and 50. When conducting, diodes 46, 48 and 50 act as variable resistances shunting high frequency inputs to the audio amplifier stages through the tone control capacitors 40, 42 and 44, respectively, to ground 19. This shunting of the high frequency signals by the series RC circuits, comprising capacitors 40, 42, 44 and diodes 46, 48 and 50, results in treble cut for each amplifier stage. Consequently, as the tone control is adjusted away from the reference potential the frequency response of each amplifier stage goes through a smooth transition from a flat response, to bass boost response as the diode 22 is reverse biased and finally to a bass boost with treble cut as the diodes 46, 48 and 50 are turned on.

The following values of circuit components, which are included for illustrative purposes and are not meant to limit the invention in any manner, were used in one operable embodiment of the invention.

| | |
|---|---|
| Potentiometer **16** | 5 K ohms |
| Potentiometer **18** | 5 K ohms |
| Resistor between **23** and **29** | 3.9 K ohms |
| Resistor **20** | 6.8 K ohms |
| Resistor **28** | 33 K ohms |
| Resistor **30** | 33 K ohms |
| Resistor **32** | 33 K ohms |
| Resistor **34** | 14.7 K ohms |
| Resistor **36** | 14.7 K ohms |
| Resistor **38** | 14.7 K ohms |
| Capacitor **40** | 0.5 $\mu f$ |
| Capacitor **42** | 0.5 $\mu f$ |
| Capacitor **44** | 0.5 $\mu f$ |

What has been disclosed therefore is a shared volume and tone control system for a plurality of audio amplifier stages which provides a smooth transition from one frequency response to another including "-flat," bass boost, and bass boost with treble cut, while reducing cost and necessary parts.

I claim:

1. A shared amplitude and frequency response control system for a plurality of amplifier stages including in combination, first and second variable bias voltage means, said first variable bias voltage means being connected to each of the amplifier stages for varying the gain thereof, first unidirectional current conducting means connecting a portion of said first variable bias voltage means to the output of said second variable bias voltage means for shunting a portion of the first bias voltage from said first variable bias means, said second variable bias voltage means being operated to reverse bias said first unidirectional current conducting means thereby reducing the shunted bias voltage from said first variable bias means to boost the gain of each amplifier stage, and a plurality of frequency response control circuits each one coupled to a respective amplifier and to said second variable bias voltage means, said frequency response control circuits being responsive to varying bias voltage from said second variable bias means to control the frequency response of the amplifiers.

2. The shared amplitude and frequency response control system according to claim 1 wherein said frequency response control circuits each include impedance means and second unidirectional current conducting means connected in series between said respective amplifier stage and reference ground potential, and means coupling the junction of said impedance means and said second unidirectional current conducting means to said output of said second variable bias voltage means.

3. The shared amplitude and frequency response control system according to claim 2 wherein said impedance means comprises a capacitor.

4. The shared amplitude and frequency response control system according to claim 2 wherein said second unidirectional current conducting means comprises a diode.

5. The shared volume and tone control device according to claim 1 wherein said first variable bias voltage means comprises a power supply, a potentiometer and a resistance in series and coupled to said reference ground potential, with said first unidirectional conducting means being connected to the junction of said potentiometer and said resistor.

6. The shared volume and tone control device according to claim 1 wherein said first variable bias voltage means comprises a power supply and potentiometer in series and coupled to said reference ground potential, said potentiometer having a fixed and variable tap with said first unidirectional conducting means connected to said fixed tap.

7. A shared volume and tone control system for a plurality of audio amplifier stages including: a bias voltage source; a first potentiometer coupled between said bias source and a reference potential and having a variable voltage output for controlling the volume of the audio output of the amplifier stages, a voltage tap on said potentiometer, a second potentiometer coupled between said bias source and a reference potential and having a variable output voltage for controlling the tone of the audio amplifier outputs; a first diode coupled between said tap on said first potentiometer and said output of said second potentiometer, said amplifier stages providing a substantially "flat" tone response with said output of said second potentiometer positioned at said reference potential; a variable frequency response network for each of said amplifier stages including a capacitor and a frequency response diode connected in series between said amplifier stage and said reference potential; means connecting the junction of each of said frequency response diode and capacitor pairs to the output of said second potentiometer, said second potentiometer being operated to forward bias said second diode thereby varying the resistance thereof in conjunction with said capacitor to shunt high frequency signals from its respective amplifier stage to provide treble cut, and said second potentiometer further being operated to reverse bias said first diode to provide bass boost.

8. The shared volume and tone control device according to claim 7 including resistance means series connected with said first diode to provide a voltage drop between said voltage tap of said first potentiometer and said output of said second potentiometer, with said amplifier stage providing flat tone response with said first diode fully conducting, and said tone response changing to bass boost with a decrease in conductivity.

* * * * *